(12) United States Patent
Desbarats et al.

(10) Patent No.: US 9,982,524 B2
(45) Date of Patent: May 29, 2018

(54) METHOD OF USING VISCOSIFIED FRACTURE FLUID TO IMPROVE FLOW OF LIQUIDS AND GASES FROM A SUBTERRANEAN FRACTURE

(71) Applicants: Andrew Desbarats, Aurora (CA); Vince Yacyshyn, Calgary (CA)

(72) Inventors: Andrew Desbarats, Aurora (CA); Vince Yacyshyn, Calgary (CA)

(73) Assignee: Immortazyme Company Ltd., Calgary, Alberta (CA)

( * ) Notice: Subject to any disclaimer, the term of this patent is extended or adjusted under 35 U.S.C. 154(b) by 131 days.

(21) Appl. No.: 14/786,070

(22) PCT Filed: Apr. 24, 2014

(86) PCT No.: PCT/IB2014/060980
§ 371 (c)(1),
(2) Date: Oct. 21, 2015

(87) PCT Pub. No.: WO2014/174479
PCT Pub. Date: Oct. 30, 2014

(65) Prior Publication Data
US 2016/0060508 A1    Mar. 3, 2016

Related U.S. Application Data

(60) Provisional application No. 61/844,050, filed on Jul. 9, 2013, provisional application No. 61/816,215, filed on Apr. 26, 2013.

(51) Int. Cl.
*E21B 43/267*    (2006.01)
*C09K 8/68*    (2006.01)
(Continued)

(52) U.S. Cl.
CPC ............. *E21B 43/267* (2013.01); *C09K 8/62* (2013.01); *C09K 8/685* (2013.01); *C09K 8/80* (2013.01); *E21B 43/26* (2013.01); *C09K 2208/24* (2013.01)

(58) Field of Classification Search
None
See application file for complete search history.

(56) References Cited

U.S. PATENT DOCUMENTS 5,437,331 A    8/1995    Styanarayana
5,998,183 A    7/1999    Le Fevre
(Continued)

FOREIGN PATENT DOCUMENTS

| CA | 2277371 | 8/2001 |
|---|---|---|
| CA | 2337122 | 9/2001 |
| WO | 2013114178 | 8/2013 |

OTHER PUBLICATIONS

International Search Report issued in PCT/IB2014/060980, dated Aug. 20, 2014, pp. 1-3.
(Continued)

*Primary Examiner* — Anuradha Ahuja
(74) *Attorney, Agent, or Firm* — Jeffrey S. Melcher; Manelli Selter PLLC

(57) ABSTRACT

A method of improving flow of liquids and gases from a subterranean fracture using a viscosified fracture fluid 1 formed by combining a solid proppant, a binding agent and an enzyme to form a proppant-immobilized enzyme 2, mixing the proppant-immobilized enzyme 2 with a second proppant 3 to form a heterogeneous proppant pack 4 and mixing said heterogeneous proppant pack 4 with a gelled liquid fracturing fluid 5 to form the viscosified fracture fluid 1 containing the heterogeneous proppant pack 4. The viscosified fracture fluid 1 containing the heterogeneous proppant pack 4 is pumped 6 into a subterranean zone 7 to form (Continued)

one or more fractures therein. The proppant-immobilized enzyme 2 that is part of the heterogeneous proppant pack 4 has the dual purpose of propping open the subterranean fractures and reducing the viscosity of the viscosified fracture fluid.

19 Claims, 2 Drawing Sheets

(51) Int. Cl.
*C09K 8/62* (2006.01)
*C09K 8/80* (2006.01)
*E21B 43/26* (2006.01)

(56) References Cited

U.S. PATENT DOCUMENTS

| | | | |
|---|---|---|---|
| 6,186,235 B1 | 2/2001 | Tjon-Joe-Pin | |
| 6,209,643 B1* | 4/2001 | Nguyen | C09K 8/5086 166/276 |
| 6,209,646 B1* | 4/2001 | Reddy | C04B 40/0633 166/293 |
| 7,000,701 B2 | 2/2006 | Todd | |
| 7,021,379 B2* | 4/2006 | Nguyen | C09K 8/62 166/280.2 |
| 7,195,071 B2 | 3/2007 | Powell | |
| 7,287,590 B1 | 10/2007 | Sullivan | |
| 7,312,056 B2 | 12/2007 | Saville | |
| 7,591,306 B2 | 9/2009 | Hocking | |
| 7,604,054 B2 | 10/2009 | Hocking | |
| 7,659,099 B2 | 2/2010 | Saville | |
| 7,677,311 B2 | 3/2010 | Abad | |
| 8,192,627 B2 | 6/2012 | Gallop | |
| 8,343,747 B2 | 1/2013 | Burke | |
| 8,393,395 B2 | 3/2013 | Cochet | |
| 8,444,962 B2 | 5/2013 | Helmke | |
| 8,720,546 B2 | 5/2014 | Alsop | |
| 8,863,855 B2 | 10/2014 | Kotlar | |
| 8,997,868 B2 | 4/2015 | Nguyen | |
| 9,303,256 B2 | 4/2016 | Mazeaud | |
| 9,598,944 B2 | 3/2017 | Frank | |
| 9,663,703 B2 | 3/2017 | Clements | |
| 2003/0106713 A1* | 6/2003 | Slater | E21B 21/01 175/5 |
| 2005/0006093 A1* | 1/2005 | Nguyen | C09K 8/62 166/281 |
| 2006/0185847 A1* | 8/2006 | Saini | C09K 8/68 166/279 |
| 2007/0166541 A1* | 7/2007 | Smith | C04B 18/082 428/402 |
| 2008/0070809 A1* | 3/2008 | Sullivan | C09K 8/68 507/211 |
| 2008/0115945 A1* | 5/2008 | Lau | C09K 8/582 166/400 |
| 2008/0128131 A1* | 6/2008 | Nguyen | E21B 43/267 166/280.2 |
| 2009/0008093 A1* | 1/2009 | Duenckel | C09K 8/805 166/280.2 |
| 2010/0011456 A1 | 3/2010 | Mathur | |
| 2013/0112413 A1 | 5/2013 | Muthusamy | |
| 2014/0000891 A1* | 1/2014 | Mahoney | C09K 8/805 166/280.2 |

OTHER PUBLICATIONS

Written Opinion issued in PCT/IBB2014/060980, dated Aug. 20, 2014, pp. 1-5.
International Preliminary Report on patentabilty issued in PCT/IB2014/060980, dated Oct. 27, 2015, pp. 1-6.
Hee-Guk Byun et al. Lipase-catalyzed hydrolysis of fish oil in an optimum emulsion system. Biotechnology and Bioprocess Engineering Oct. 2007, 12: 484.
Christensen, MW et al. Industrial lipase Immobilization. Eur J Lipid SCi Technol 105 (2003) 318-321.
Enzymatic Inter esterification. AOCS Lipid Library. W. David Cowan, Mar. 9, 2011.

* cited by examiner

METHOD OF USING VISCOSIFIED FRACTURE FLUID TO IMPROVE FLOW OF LIQUIDS AND GASES FROM A SUBTERRANEAN FRACTURE

This application claims priority to U.S. provisional patent application Ser. Nos. 61/816,215, filed 26 Apr. 2013 and 61/844,050, filed 9 Jul. 2013, the complete disclosures of which are incorporated herein by reference.

FIELD OF THE INVENTION

The invention relates to a proppant having an immobilized enzyme, a viscosified fracture fluid suitable for use in improving flow of liquids and gases from a subterranean hydraulic fracture, and a method for improving the extraction of oil and gas from subterranean fractures.

BACKGROUND OF THE INVENTION

Liquid enzyme solutions are now being used as breakers in hydraulic fracturing and horizontal drilling applications in the oil and gas industry. One of the requirements of an enzyme used as a breaker in a subterranean formation is that it retains its activity at high pressure, such as at temperatures reaching up to 150 degrees Celsius and at a pH ranging from 4 to 12.

Fracturing fluids are mixtures that contain various components, each with a purpose in the fracturing method. Fracturing fluids include drilling fluids, diverting fluids and gravel-packing fluids. Fracturing fluid components include proppants, such as sand, silica, glass beads, metal particulate matter, sintered bauxite and other ceramic proppants, ultralight weight (ULW) and other matter, to 'prop' open subterranean fractures from which oil and gas flow into a wellbore and are recovered; viscosifying agents or gelling agents such as guar gum, xanthan gum and others, are added to increase the specific gravity of the fracturing fluid to carry proppants to the subterranean fractures; and breakers which reduce the viscosity of the viscosifying agents so that the oil and gas can flow into the wellbore. The breakers are important in maximizing the recovery of oil and gas from the well. The viscosifying agents are typically selected from galactomannan gums, guars, derivatized guars, cellulose, cellulose derivatives, starch, starch derivatives, xanthan, xanthan derivatives and mixtures thereof. While these viscosifying agents are effective at carrying sand or other proppants into the subterranean formations, they often form a rubbery solid with elastic properties called "filter cake" that reduces the flow of gas and/or oil from the subterranean formation. It is therefore useful to prevent formation of filter cake, or to dissolve the filter cake once it is formed. Breakers are a class of chemical that reduce the viscosity of fracturing fluid and prevent filter cake build-up.

Breakers are typically selected from three different classes of chemicals: oxidizers, enzymes and acids. Enzymes are useful as breakers because they are naturally occurring proteins that are specific to the viscosifying polymers listed above. Enzymes such as alpha-amylases, glucoamylases, xanthanases, xylanases, cellulases, hemicellulases, cellobiohydrolases, beta-glucanases, and others, hydrolyze the bonds that characterize viscosifying polymers. Enzymes are generally preferable from an environmental perspective, to oxidizers such as sodium persulfate, ammonium persulfate, chlorates, bromates, periodates and acids such as citric acid and fumaric acid among others.

Typically, viscosifying agents and proppants are pumped into a wellbore under sufficient pressure to cause the subterranean formation to fissure. The viscosifying agent ensures the proppant is carried into the fissure. Subsequently, the breaker is pumped into the wellbore. Breaker and viscosifying agents come into contact and the breaker reduces the viscosity of the fracturing fluid. It is difficult to ensure the breaker reaches the viscosifying agent and filter cake located in the fissures. In addition, since breakers are typically water soluble and there is significant fluid loss, in the subterranean formation, much of the breaker is lost with the fluid. The increased viscosity of the fracturing fluid also reduces the diffusion of the breaker in the formation. In order to overcome the loss and reduced diffusion, increased volumes of breaker are required which increases cost.

U.S. Pat. No. 8,343,747, and published U.S. Patent Application No. 20100011456 assigned to Verenium Corporation, disclose a series of genetic sequences that code for enzymes that can be used in hydraulic fracturing to reduce the viscosity of drilling mud and other viscosified treatment fluids used in subterranean formations. These documents do not teach or suggest that such enzymes can be immobilized on the proppant such as sand or silica as a delivery mechanism to co-locate the enzyme breaker with the viscosifying agent that the enzyme is designed to hydrolyze.

Cochet et al., U.S. Pat. No. 8,393,395, describes encapsulation of breakers, including enzymes in a water-insoluble matrix and pumping these into a subterranean formation for the purpose of delayed release of breaker to reduce viscosity of a viscosified fracturing fluid. While Cochet's method provides benefits in terms of delaying the viscosity reduction until proppant has entered the fracture, Cochet requires the addition of both the water-insoluble matrix and the proppant.

Abad et al., U.S. Pat. No. 7,677,311, describes a composition and method for breaking viscous fluids by providing a solid particle that can be located in a subterranean fracture then subsequently decomposing into a breaker for the viscosifying fluid. Abad's method also ensures that breaker is localized in the fracture where needed, at least initially. Sullivan et al., U.S. Pat. No. 7,287,590, describes a delayed breaker. However, a limitation of both the Abad and Sullivan methods is that once solubilized, the breaker could be carried back up to the well surface, thereby nullifying its ability to reduce viscosity in the formation. The solubilized breaker may also be lost within the porous formation itself.

U.S. Patent Application No. 20130112413 (Muthusamy et al.), discloses a method of controlled release of enzyme breakers for oil field applications. Muthusamy discloses a viscosified treatment fluid consisting of a gelling agent, a crosslinking agent, a proppant, an aqueous-base fluid and a poly(meth)acrylate encapsulant that encapsulates at least one of an enzyme, an oxidizer, a chelator and an acid. Muthusamy's encapsulation method suffers from the same problems as the Abad and Sullivan methods.

Powell, U.S. Pat. No. 7,195,071, discloses that a succinoglycan hydrolysis enzyme can be impregnated on a carrier for delayed release. This method is suitable when delayed release of enzyme is desired however the enzymes eventually become soluble and may be lost to the formation with other fluids, or inactivated over time as is often the case with soluble enzymes. In addition, any improved stability of the enzyme conferred by impregnating the enzyme on a carrier is likely reversed when the enzyme is released.

Both, U.S. Pat. No. 5,437,331 (Gupta et al.) and U.S. Pat. No. 7,000,701 (Todd) disclose a method of fracturing a subterranean formation by, inter alia, encapsulating an enzyme breaker. In the case of U.S. Pat. No. 5,437,331, the enzyme breaker uses open cellular encapsulation to protect and delay the action of the enzyme. Todd uses a partially hydrolyzed acrylic material as polymer for encapsulation.

Gupta, Todd, Powell, Muthusamy, Cochet and Abad do not teach or even suggest a method for retaining the breaker on the solid particle so that the breaker is not lost in the formation or when the petroleum fluids flow back to the surface of the earth. Moreover, these patents do not teach that the proppant can be used as an immobilization media and that in doing so, the fracturing method can be improved and simplified and, in certain cases, the enzyme breaker can be recovered and reused.

U.S. Pat. No. 7,021,379 (Nguyen) describes a method of forming subterranean fractures penetrated by a well bore and consolidating proppant particles therein where the particles are coated with a hardenable organic resin, a silane coupling agent and a gel breaker. Nguyen discloses the use of enzymes as gel breakers, among other chemicals such as oxidizers and acids. Nguyen's proppant requires three separate chemicals as part of the coating composition; a hardenable resin, a silane coupling agent and a gel breaker. Nguyen's method employs breakers that facilitate removal of gelled carrier fluid from the surface of hardenable resin-coated proppant particles allowing for resin coated particle-to-particle contact.

U.S. Pat. No. 6,186,235 (Tjon-Joe-Pin) discloses a method of forming a breaker-crosslinker-polymer complex where the breaker is in an inactive form prior to a change in subterranean conditions at which point the breaker is activated. Once the breaker begins to breakdown the gelled polymer complex, the soluble breaker can be lost through the formation. Tjon-Joe-Pin does not disclose the use of proppant as a solid phase upon which the breaker can be immobilized.

U.S. Pat. No. 5,998,183 (LeFevre et al.) and U.S. Pat. No. 7,312,056 (Saville and Khavkine) disclose methods of immobilizing enzymes on a support matrix for use in commercial chemical production methods, such as pharmaceuticals and syrups. Both of these immobilization methods do not disclose forming a proppant having an immobilized enzyme. The methods in these patents can be modified using the present invention to provide the formation of an improved proppant-immobilized enzyme described herein. The complete disclosures of U.S. Pat. Nos. 5,998,183 and 7,312,056 are incorporated herein by reference.

SUMMARY OF THE INVENTION

The present invention relates to a novel proppant and a novel viscosified fracture fluid comprising the proppant that is suitable for use in improving flow of liquids and gases from a subterranean hydraulic fracture. The proppant has both proppant functionality and gel-breaking functionality. This dual function proppant can reduce the cost of hydraulic fracturing and improve the recovery of hydrocarbon-rich gases and fluids from a subterranean formation.

The present invention provides an improvement over U.S. Pat. No. 7,021,379 (Nguyen) since the novel method by which a breaker is immobilized on a proppant is less costly and less time-consuming. More importantly the effectiveness of the immobilized breaker according to the present invention is unexpectedly greater than that disclosed in U.S. Pat. No. 7,021,379 as measured by the slope of the curve of viscosity vs. time. The unexpected results shown in the Examples illustrate the advantages of the present invention over Nguyen.

The present invention further relates to a method of hydraulic fracturing using the novel proppant that acts to prop open subterranean fractures and also acts as a gel breaker to reduce the viscosity of the gelled fracturing fluid. By immobilizing an enzyme capable of reducing the viscosity of the viscosifying and gelling agents, and locating the enzyme on the proppant itself, localization of the gel breaker to the subterranean fractures through which oil and gas flow into the wellbore is assured. Moreover, loss of soluble breaker by absorption into the subterranean formation is prevented.

A novel way to ensure breakers diffuse into the subterranean fractures to reduce filter cake and maximize oil and gas recovery, is to immobilize breakers on the proppant itself. This procedure eliminates the need for complex encapsulation reactions, increases the stability of the enzyme breaker and ensures the enzyme breaker is localized in the subterranean fracture so that viscosity reduction in these small fracture channels is maximized. The present invention provides unexpected stability enhancements under the high temperatures varied pH ranges and high pressures found in subterranean fractures.

The present invention also relates to the recovery and reuse of the novel proppant by methods such as those published in U.S. Pat. No. 7,659,099, the complete disclosure of which is incorporated herein by reference.

DETAILED DESCRIPTION

The present invention relates to a novel proppant, a novel viscosified fracture fluid comprising the proppant, and a method of using the proppant or viscosified fracture fluid for improving flow of liquids and gases from a subterranean hydraulic fracture. The proppant also acts to reduce the viscosity of the fluid used to deliver the proppant to the subterranean fractures thereby acting as a gel breaker. By immobilizing an enzyme capable of reducing the viscosity of the viscosifying and gelling agents, and locating the enzyme on the proppant itself, diffusion of the gel breaker to the subterranean fractures through which oil and gas flow into the wellbore is assured. The invention will be explained with reference to the attached non-limiting drawings.

Figure 1:
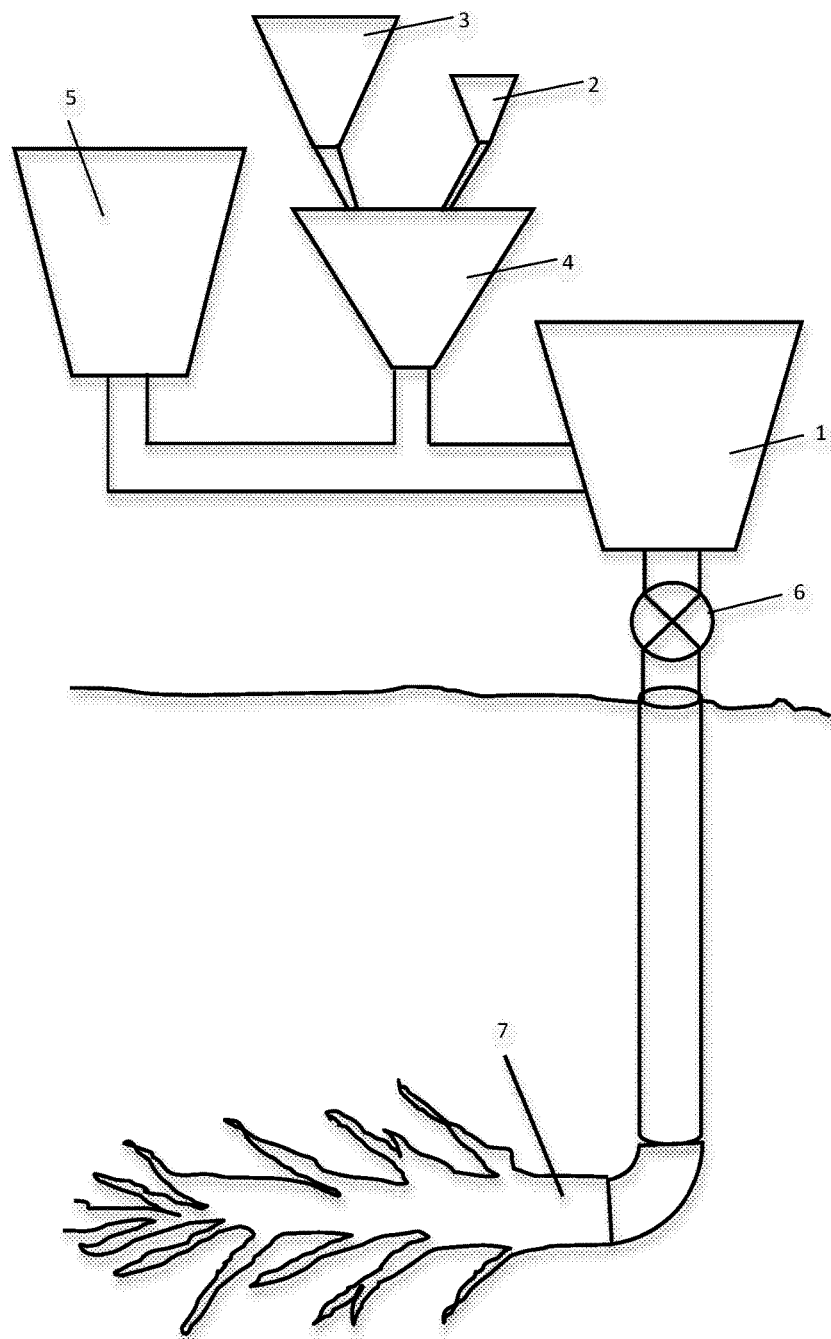
FIG. 1 illustrates a method of fracturing.
Figure 2:
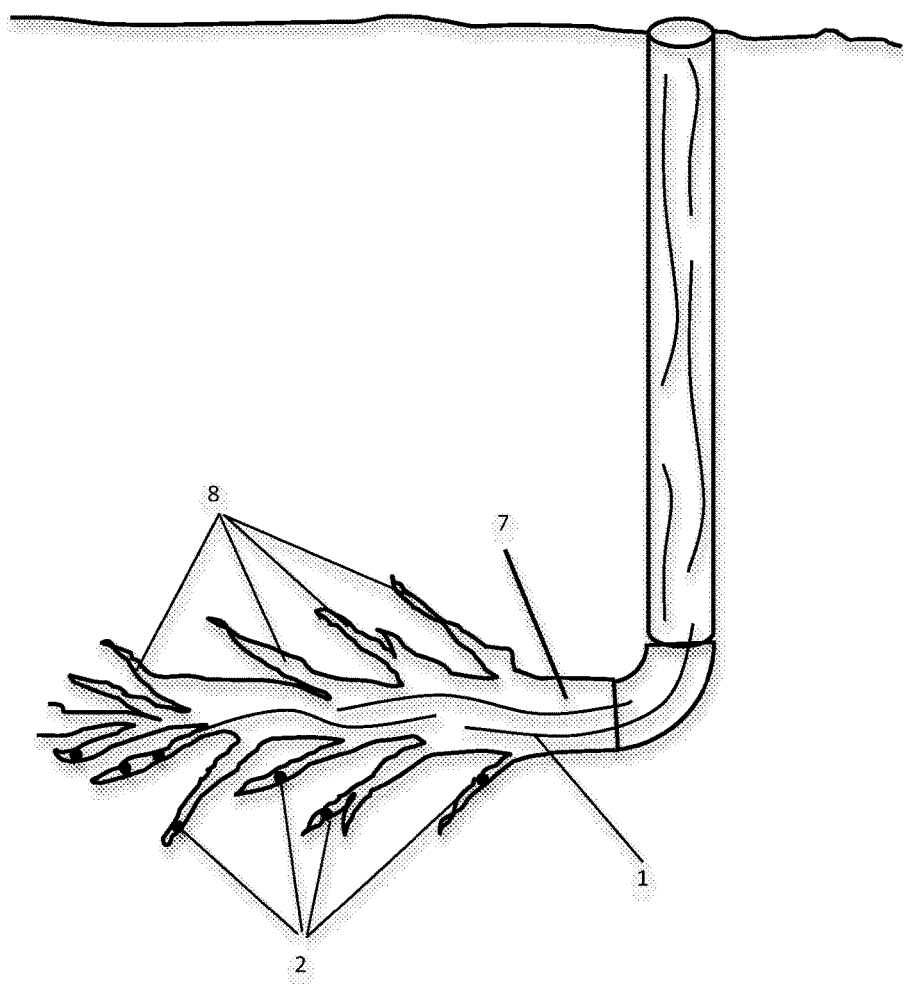
FIG. 2 illustrates the proppant remaining in a fracture.

As shown in FIGS. 1 and 2, the viscosified fracture fluid 1 can be formed by combining a solid proppant, a binding agent, and an enzyme to form a proppant-immobilized enzyme 2; mixing said proppant-immobilized enzyme 2 with a second proppant 3 to form a heterogeneous proppant pack 4; and mixing said heterogeneous proppant pack 4 with a gelled liquid fracturing fluid 5 to form a viscosified fracture fluid 1 containing the heterogeneous proppant pack 4. The viscosified fracture fluid 1 containing the heterogeneous proppant pack 4 can then be pumped 6 or delivered into a subterranean zone 7 to form one or more fractures 8 therein. The proppant-immobilized enzyme 2 that is part of the heterogeneous proppant pack 4 has the dual purpose of propping open the subterranean fractures 8 and reducing the viscosity of the viscosified fracture fluid 1. As the viscosity of the viscosified fracture fluid 1 is reduced, it is removed from the subterranean zone 7. Subsequently, the flow of liquids and gases into the subterranean fractures 8 that are propped open by the heterogeneous proppant pack 4 containing proppant-immobilized enzyme 2 is improved.

Enzymes useful in the present invention include any enzyme that acts on a substrate that is used as a gelling or viscosifying agent such as, but not limited to guar gum, xanthan gum, starchy polysaccharides, cellulose and cellulose-based gelling agents. Many commercially available enzymes are available to hydrolyze these viscosifying agents. An example of suitable enzymes include, but are not limited to, the group 3 hydrolases. Specific examples of suitable enzymes include, but are not limited to, mannanase, alpha-amylase, glucoamylase, cellulase, hemicellulase, xylanase, beta-glucanase, cellobiohydrolase, xanthanase or asparaginase.

Proppants are now well known. Non-limiting examples of suitable proppants are sand, fracking sand, silica, aluminum silicate, zeolite, sintered bauxite, ceramic beads, glass beads, glycoxyl-agarose, curable or non-curable resin and metal particulate matter. A preferred proppant is fracking sand granules.

Enzyme immobilization methods using binding agents to immobilize an enzyme to a substrate are now well-known, a few of which are described in the background section above. However, prior to the present invention, such methods have not been used to bind an enzyme to a proppant. The prior art methods utilize a support matrix to bind the enzyme for use in chemical processes, such as for forming pharmaceuticals or syrups. The prior art support matrix is different from a proppant. Proppants have specific properties not required from the prior art support matrix. The prior art immobilization methods can be modified by replacing the support matrix with a proppant. Any suitable immobilization method can be used to bind the enzyme to the proppant.

Immobilization of an enzyme to the proppant, such as fracking sand, can be accomplished using any suitable binding agent. An example of a suitable binding agent includes, but is not limited to, crosslinkers. Preferred binding agents are dialdehydes. A most preferred binding agent is glutaraldehyde. Commercially available glutaraldehyde solutions are commonly used in fracking fluid as a biocide. Therefore, the present invention can use existing fracking fluid components to create a simplified and enhanced fracking fluid wherein the biocide can now be used as an immobilized enzyme cross-linker in addition to a biocide.

There are numerous advantages of creating a proppant-immobilized enzyme and using the same as a breaker:
1) the proppant-immobilized enzyme can be recovered and reused in subsequent fractures,
2) proppant and immobilized breaker can be localized in the subterranean fractures to ensure that viscous fluid and hardened thickening agents can be hydrolyzed to improve flow of hydrocarbon-rich liquids and gases,
3) immobilized enzymes often display enhanced thermal stability and pH stability, allowing breakers to continue to function over long periods of time under harsh conditions, and
4) dialdehyde cross-linkers can be used as biocides, reducing the requirements to add exogenous biocides.

The proppant-immobilized enzyme has unexpected, increased enzyme stability at high temperatures and pressures. In a preferred embodiment, the enzyme is more stable immobilized on the proppant than it would be as an enzyme breaker that is soluble in the fracking fluid. The proppant-immobilized enzyme is surprisingly active at temperatures up to 80 Celsius degrees.

The enzyme immobilized to the proppant is also more stable to chemical denaturation as a function of its immobilization. This characteristic allows for new fracking fluid components that otherwise could not be used due to their deleterious effects on the soluble enzyme breakers. For example, a fracturing fluid with a pH outside of the soluble enzymes active range may not be feasible for use with a soluble enzyme breaker. However, the novel proppant-immobilized enzyme disclosed herein can now be used in a broadened pH range, allowing for a wider selection of fracturing fluid components, and lower costs and better performance.

A viscosified fracture fluid can be formed by mixing the proppant with a suitable liquid fracturing fluid. Fracturing fluids are now well known. Any suitable fracturing fluid can be used. The viscosified fracture fluid can also contain at least one more additional proppant. The additional proppant can be any conventional proppant not having an immobilized enzyme thereon.

A preferred viscosified fracture fluid can be formed by combining the solid proppant, the binding agent and the enzyme to form a proppant-immobilized enzyme; mixing the proppant-immobilized enzyme with a second proppant to form a heterogeneous proppant pack; and mixing said heterogeneous proppant pack with a gelled liquid fracturing fluid to form a viscosified fracture fluid containing the heterogeneous proppant pack.

The viscosified fracture fluid can be used to improve a flow of liquids and gases from a subterranean hydraulic fracture comprising the steps of pumping the viscosified fracture fluid into a subterranean zone to form one or more fractures therein; and removing the fracture fluid from the subterranean zone leaving the proppant in the formation. The proppant-immobilized enzyme reduces viscosity of the viscosified fracture fluid in the subterranean zone. The proppant-immobilized enzyme can be recycled from the subterranean fracture and the proppant-immobilized enzyme reused as a proppant in a second subterranean fracture.

The rate of hydrolysis of the viscosified fracture fluid by the proppant-immobilized enzyme can be between 10% and 25% of that of the soluble enzyme from which the proppant-immobilized enzyme is derived. More preferably the rate of hydrolysis of the viscosified fracture fluid by the proppant-immobilized enzyme is between 26% and 50% of that of the soluble enzyme from which the proppant-immobilized enzyme is derived. Even more preferably the rate of hydrolysis of the viscosified fracture fluid by the proppant-immobilized enzyme is between 51-100% of that of the soluble enzyme from which the proppant-immobilized enzyme is derived. Most preferably the rate of hydrolysis of the viscosified fracture fluid by the proppant-immobilized enzyme is over 100% of that of the soluble enzyme from which the proppant-immobilized enzyme is derived.

The half-life of the proppant-immobilized enzyme is preferably equivalent to the half-life of the soluble enzyme from which the proppant-immobilized enzyme is derived. More preferably the half-life of the proppant-immobilized enzyme is 1.1-fold to 2-fold greater than the half-life of the soluble enzyme from which the proppant-immobilized enzyme is derived. Even more preferably the half-life of the proppant-immobilized enzyme is greater than 2-fold the half-life of the soluble enzyme from which the proppant-immobilized enzyme is derived. Most preferably, the half-life of the proppant-immobilized enzyme is between 1.5 times and 5 times the half-life of the soluble enzyme.

Example 1

An enzyme was immobilized on a proppant using a binding method similar to that disclosed in Le Fevre in U.S. Pat. No. 5,998,183. Briefly, 200 mL of water was mixed manually with 32 mL of 25% glutaraldehyde. To the water/glutaraldehyde solution, 32 grams of proppant (hydraulic fracturing sand), with a mesh size of 20×40, was added. The mixture was mixed in a blender at low speed for three hours and fifty minutes to modify the proppant to produce a glutaraldehyde-bound proppant. The glutaraldehyde-bound proppant was separated from the water/glutaraldehyde mixture by vacuum filtration through a 1 µm filter and dried. An enzyme solution comprising mannanase, cellulase, hemicellulase and other hydrolase activities was mixed in a pH 6.0, 0.01 M phosphate buffer in a ratio of 1 part enzyme to 9 parts phosphate buffer to form a dilute enzyme solution.

Glutaraldehyde-bound proppant was gently mixed with the dilute enzyme solution on a magnetic stir plate for 4 hours to form a proppant-immobilized enzyme where enzyme was immobilized via glutaraldehyde cross-linkages. Subsequently, the filtrate was removed by vacuum filtration through a 2.5 µm filter. The proppant-immobilized enzyme was dried.

Proppant-immobilized enzyme was assayed for its ability to reduce the viscosity of a viscous guar solution over time. The following table shows the results of the assay using no enzyme (blank), the usual soluble enzyme dose (1 Liter/m3) and the proppant-immobilized enzyme. Results are measured in units of Apparent Viscosity (cP).

TABLE 1

| Time (min) | Blank (cP) | Standard soluble enzyme dose (1 Litre/m3) (cP) | Proppant Immobilized Enzyme (1 gram/L) (cP) |
|---|---|---|---|
| 0 | 58 | 58 | 58 |
| 15 | 50 | 42 | 40 |
| 30 | 48 | 33 | 32 |
| 60 | 44 | 25 | 20 |
| 90 | 42 | 20 | 13 |
| 210 | 37 | 13 | 7 |
| 270 | 33 | 12 | 6 |
| 330 | 28 | 10 | 5 |
| 1470 | 7.5 | 5 | — |

The enzyme immobilized on modified hydraulic fracturing sand clearly reduced the viscosity of the guar solution over 1470 minutes. By immobilizing enzyme breaker on proppant to create an enhanced hydraulic fracturing proppant and using the present invention to localize the enhanced hydraulic fracturing proppant in the subterranean fractures, the viscosity of the solution in the fractures can be reduced allowing increased volumes of oil and gas to flow into the well for recovery.

Example 2

Immobilized enzyme was prepared by incubating 2% N-2-(aminoethyl)-3-aminopropyltrimethoxysilane (APTS) in acetone with 16 grams of proppant. The APTS/proppant was then incubated with 40 mL of 2% glutaraldehyde in sodium phosphate buffer, pH 7.0 for 3 hours. The resulting proppant was incubated overnight with 100 mL of a 10% enzyme breaker and borate buffer solution (pH 9.0). The enzyme solution was decanted and the proppant was then washed with distilled water, vacuum filtered and left to dry overnight. The proppant was then baked at 60 degrees Celsius for 1 hour. Enzyme immobilized using the APTS method was assayed as explained in Example 1.

Similarly, immobilization with 3-glycidoxypropyltrimethoxysilane (GPTMS) was carried out by incubating 2.5 mL GPTMS in 47.5 mL of 0.01 M pH 9 borate buffer with 16 grams of proppant for 2 hours at 60 degrees Celsius. The GPTMS-treated proppant was then washed and dried followed by incubation in 20-50 mL of 0.1M sulfuric acid for 2 hours. The sulfuric acid was decanted, the GPTMS-treated proppant was washed with distilled water and left to dry overnight. The resulting proppant was incubated overnight with 100 mL of a 10% enzyme breaker and borate/carbonate buffer solution (pH 10.0). The enzyme solution was decanted and the proppant was then washed with distilled water, vacuum filtered and left to dry overnight. The proppant was then baked at 60 degrees Celsius for 1 hour. Enzyme immobilized using the GPTMS method was assayed as explained in Example 1.

The Table 2 below shows a comparison of viscosity reduction of various enzyme breakers in a 40 degree C., pH 9.5 viscosified fracturing fluid where the gelling agent was guar. Relative viscosity, measured in centipoises (cP) was tracked over time. The immobilized breaker used in the present invention reduced viscosity more than both the soluble enzyme and the coated resin particle described by U.S. Pat. No. 7,021,379 (Nguyen).

TABLE 2

| | Negative Control (no breaker) | Soluble Enzyme | APTS Proppant breaker | GPTMS Proppant breaker | Immobilized Breaker (present invention) |
|---|---|---|---|---|---|
| 0 | 58 | 58 | 55 | 55 | 58 |
| 15 min | 50 | 42 | 53 | 54 | 40 |
| 30 min | 48 | 33 | 53 | 52 | 32 |
| 60 min | 44 | 25 | 50 | 52 | 20 |
| 90 min | 42 | 20 | 48 | 52 | 13 |
| 210 min | 37 | 13 | 41 | 50.5 | 7 |
| 270 min | 33 | 12 | 39 | 50 | 6 |
| 330 min | 28 | 10 | 33 | 48 | 5 |
| 1470 min | 7.5 | 5 | 12 | 34 | 2.5 |

While the claimed invention has been described in detail and with reference to specific embodiments thereof, it will be apparent to one of ordinary skill in the art that various changes and modifications can be made to the claimed invention without departing from the spirit and scope thereof.

The invention claimed is:

1. A method of improving a flow of liquids and gases from one or more fractures in a subterranean zone comprising the steps of:
   pumping a fracture fluid comprising a liquid fracturing fluid and a proppant immobilized enzyme into the subterranean zone to form the one or more fractures in the subterranean zone, wherein the proppant immobilized enzyme comprises a proppant, a viscosity-reducing enzyme, and a binding agent binding the viscosity-reducing enzyme to the proppant so that the viscosity-reducing enzyme is immobilized on the proppant;
   propping open the one or more fractures by a portion of the proppant immobilized enzyme;
   reducing a viscosity of the liquid fracturing fluid in the subterranean zone by the viscosity-reducing enzyme immobilized on the portion of the proppant immobilized enzyme to form a viscosity-reduced liquid fracturing fluid; and
   removing the viscosity-reduced liquid fracturing fluid from the subterranean zone leaving the portion of the proppant immobilized enzyme in the subterranean zone to prop open the one or more fractures to allow the liquids and gases to flow from the one or more factures propped open by the portion of the proppant immobilized enzyme.

2. The method of claim 1, further comprising removing an other portion of the proppant-immobilized enzyme from the one or more fractures along with the viscosity-reduced liquid fracturing fluid, recycling the other portion of the proppant-immobilized enzyme, and reusing the other portion of the proppant-immobilized enzyme in a second subterranean fracture.

3. The method of claim 1, wherein a rate of hydrolysis of the liquid fracturing fluid by the proppant-immobilized enzyme is between 10% and 25% of that of the viscosity-reducing enzyme from which the proppant-immobilized enzyme is derived.

4. The method of claim 1, wherein a half-life of the proppant-immobilized enzyme is equivalent to a half life of the viscosity-reducing enzyme from which the proppant-immobilized enzyme is derived.

5. The method of claim 1, wherein a rate of hydrolysis of the liquid fracturing fluid by the proppant-immobilized enzyme is between 26% and 50% of that of the viscosity-reducing enzyme from which the proppant-immobilized enzyme is derived.

6. The method of claim 1, wherein a rate of hydrolysis of the liquid fracturing fluid by the proppant-immobilized enzyme is over 100% of that of the viscosity-reducing enzyme from which the proppant-immobilized enzyme is derived.

7. The method of claim 1, wherein a half-life of the proppant-immobilized enzyme is 1.1-fold to 2-fold greater than a half life of the viscosity-reducing enzyme from which the proppant-immobilized enzyme is derived.

8. The method of claim 1, wherein a half-life of the proppant-immobilized enzyme is between 1.5 times and 5 times a half-life of the viscosity-reducing enzyme.

9. The method of claim 1, wherein the enzyme is a group 3 hydrolase.

10. The method of claim 1, wherein the enzyme comprises at least one enzyme selected from the group consisting of mannanase, alpha-amylase, glucoamylase, cellulase, hemicellulase, xylanase, beta-glucanase, cellobiohydrolase, xanthanase or asparaginase.

11. The method of claim 1, wherein the proppant comprises at least one proppant selected from the group consisting of sand, fracking sand, silica, aluminum silicate, zeolite, sintered bauxite, ceramic beads, glass beads, glycoxyl-agarose, curable or non-curable resin and metal particulate matter.

12. The method of claim 1, wherein the binding agent comprises a dialdehyde.

13. The method of claim 1, wherein the binding agent comprises a glutaraldehyde cross-linker.

14. A method of improving a flow of oil and gas from one or more fractures in a subterranean zone comprising the steps of:
pumping a fracture fluid comprising a liquid fracturing fluid and a proppant immobilized group 3 hydrolase enzyme down a wellbore into the subterranean zone to form the one or more fractures in the subterranean zone, wherein the proppant immobilized enzyme comprises a proppant, a group 3 hydrolase enzyme, and a binding agent binding the group 3 hydrolase enzyme to the proppant so that the group 3 hydrolase enzyme is immobilized on the proppant;
propping open the one or more fractures by a portion of the proppant immobilized group 3 hydrolase enzyme;
reducing a viscosity of the liquid fracturing fluid in the subterranean zone by the group 3 hydrolase enzyme immobilized on the portion of the proppant immobilized group 3 hydrolase enzyme to produce a viscosity-reduced fracturing fluid; and
removing the viscosity-reduced fracturing fluid from the subterranean zone and leaving the portion of the proppant immobilized enzyme in the subterranean zone to prop open the one or more fractures so that the oil or gas can flow through the one or more fractures into the wellbore.

15. The method according to claim 14, wherein the proppant comprises fracking sand granules.

16. The method according to claim 14, wherein the proppant comprises at least one proppant selected from the group consisting of sand, fracking sand, silica, aluminum silicate, zeolite, sintered bauxite, ceramic beads, glass beads, glycoxyl-agarose, curable or non-curable resin and metal particulate matter.

17. The method according to claim 14, wherein the binding agent comprises a dialdehyde.

18. The method according to claim 14, wherein the binding agent comprises a glutaraldehyde cross-linker.

19. The method of claim 14, further comprising removing an other portion of the proppant-immobilized enzyme from the one or more fractures along with the viscosity-reduced liquid fracturing fluid, recycling the other portion of the proppant-immobilized enzyme, and reusing the other portion of the proppant-immobilized enzyme in a second subterranean fracture.

* * * * *